United States Patent
Sato et al.

(10) Patent No.: US 9,414,613 B2
(45) Date of Patent: Aug. 16, 2016

(54) TEA EXTRACT

(75) Inventors: Hitoshi Sato, Kamisu (JP); Hideaki Ueoka, Kamisu (JP); Keiji Shibata, Kamisu (JP)

(73) Assignee: Kao Corporation, Tokyo (JP)

( * ) Notice: Subject to any disclaimer, the term of this patent is extended or adjusted under 35 U.S.C. 154(b) by 1034 days.

(21) Appl. No.: 12/518,519

(22) PCT Filed: Dec. 28, 2006

(86) PCT No.: PCT/JP2006/326243
§ 371 (c)(1),
(2), (4) Date: Jun. 10, 2009

(87) PCT Pub. No.: WO2008/081542
PCT Pub. Date: Jul. 10, 2008

(65) Prior Publication Data
US 2010/0021615 A1  Jan. 28, 2010

(51) Int. Cl.
*A23F 3/16* (2006.01)
*A23F 3/20* (2006.01)
*A23F 5/24* (2006.01)
*A23L 1/30* (2006.01)
*A23L 2/52* (2006.01)

(52) U.S. Cl.
CPC . *A23F 3/163* (2013.01); *A23F 3/16* (2013.01); *A23F 3/20* (2013.01); *A23F 3/205* (2013.01); *A23F 5/243* (2013.01); *A23L 1/3002* (2013.01); *A23L 2/52* (2013.01); *A23V 2002/00* (2013.01)

(58) Field of Classification Search
USPC .......................................................... 426/56
See application file for complete search history.

(56) References Cited

U.S. PATENT DOCUMENTS

| | | | | |
|---|---|---|---|---|
| 4,935,256 | A * | 6/1990 | Tsai | 426/330.3 |
| 6,113,965 | A | 9/2000 | Goodsall et al. | |
| 6,482,450 | B1 * | 11/2002 | Goodsall et al. | 426/52 |
| 6,491,961 | B1 * | 12/2002 | Balentine et al. | 426/597 |
| 7,014,876 | B2 * | 3/2006 | Iwasaki et al. | 426/77 |
| 2003/0082273 | A1 | 5/2003 | Iwasaki et al. | |
| 2003/0096050 | A1 | 5/2003 | Inaoka et al. | |
| 2005/0095342 | A1 * | 5/2005 | Ogura et al. | 426/597 |
| 2005/0129829 | A1 * | 6/2005 | Hosoya et al. | 426/597 |
| 2006/0099318 | A1 | 5/2006 | Iwasaki et al. | |
| 2007/0141219 | A1 * | 6/2007 | Iwasaki et al. | 426/597 |
| 2007/0292544 | A1 | 12/2007 | Hara et al. | |

FOREIGN PATENT DOCUMENTS

| | | |
|---|---|---|
| CN | 1771823 A | 5/2006 |
| EP | 2 022 346 A1 | 2/2009 |
| JP | 60-156614 | 8/1985 |
| JP | 3-133928 | 6/1991 |
| JP | 11 225672 | 8/1999 |
| JP | 2003 33157 | 2/2003 |
| JP | 2003 169641 | 6/2003 |
| JP | 2004-321105 | 11/2004 |
| JP | 2005-160395 | 6/2005 |
| JP | 2006-36645 | 2/2006 |
| JP | 2006 83352 | 3/2006 |
| JP | 2006 129738 | 5/2006 |
| JP | 2006-271401 | 10/2006 |

OTHER PUBLICATIONS

Chinese Office Action issued Jan. 26, 2011, in Patent Application No. 200680056439.X (with English Translation).
Supplementary European Search Report issued Jan. 16, 2012, in European Patent Application No. 06843621.1 filed Dec. 28, 2006.
Office Action issued Dec. 28, 2012, in Chinese Patent Application No. 200680056439.X filed Dec. 28, 2006 (with English translation).

* cited by examiner

*Primary Examiner* — Tamra L Dicus
(74) *Attorney, Agent, or Firm* — Oblon, McClelland, Maier & Neustadt, L.L.P.

(57) ABSTRACT

This invention relates to a tea extract, which is reduced in bitterness, sourness and coarse taste, has a good affinity with various beverages, and contains non-polymer catechins that are highly stable in a sterilized beverage to which the tea extract is added.

A purified tea extract, including:
(1) non-polymer catechins (a) in a solid content accounting for from 45 to 90 wt. %;
(2) a percentage of gallate body in the non-polymer catechins being from 0.001 to 47 wt. %; and
(3) a weight ratio of a gallic acid/the non-polymer catechins being not greater than 0.3.

19 Claims, No Drawings

TEA EXTRACT

FIELD OF THE INVENTION

This invention relates to a tea extract, which is reduced in bitterness, sourness and coarse taste, has a good affinity with various beverages, and contains non-polymer catechins that are highly stable in a sterilized beverage to which the tea extract is added.

Catechins are reported to have the ability to suppress an increase in cholesterol, an inhibitory action on amylase-activity, and the like (e.g. Patent Documents 1 and 2). In order for such physiological effects of catechins to materialize, it is necessary for an adult to drink 4 to 5 cups of tea a day. Hence there has been a strong demand for a technology that enables a beverage to contain a high concentration of catechins so that a large amount of catechins can be conveniently ingested.

As a production process of a tea extract, a tea extract having a high percentage of gallate body and a production process thereof are known (Patent Document 3). As a method for improving the tastes of a beverage (e.g. bitterness and astringency) and preventing the emergence of dregs and creaming down, there is a technique known for adding a tea extract having a high percentage of gallate body to a tea beverage (Patent Document 4). Also known is a method for controlling the percentage of gallate body by tannase treatment so that the taste of a green tea extract can be improved (Patent Document 5). Nevertheless, a more improved technique has been increasingly needed in respect to the taste of a tea extract.

The content of catechins contained in a beverage tends to decrease upon thermal sterilization, even when the catechin content is at a high level. In order to avoid such tendency, a method is known that reduces a decrease of catechins in a coffee beverage by adjusting its pH (Patent Document 6). This method, however, requires an extremely strict caution for the adjustment of pH, so that a method applicable to a wider variety of beverages has been in demand.

Patent Document 1: JP-A-60-156614
Patent Document 2: JP-A-03-133928
Patent Document 3: JP-A-2006-036645
Patent Document 4: JP-A-2006-271401
Patent Document 5: JP-A-2004-321105
Patent Document 6: JP-A-2005-160395

DISCLOSURE OF THE INVENTION

The present invention provides a purified tea extract, including:

(1) non-polymer catechins (a) in a solid content accounting for from 45 to 90 wt. %;
(2) a percentage of gallate body in the non-polymer catechins being from 0.001 to 47 wt. %; and
(3) a weight ratio of a gallic acid/the non-polymer catechins being not greater than 0.3.

EMBODIMENTS OF THE INVENTION

A purpose of the present invention is to provide a purified tea extract, which is reduced in bitterness, sourness and coarse taste, has a good affinity with various beverages, and contains non-polymer catechins that are highly stable in a sterilized beverage to which the tea extract is added.

The present inventors conducted researches into the taste of tea extracts containing a high concentration of catechins. As a result, the present inventors succeeded in reducing the bitterness, sourness and coarse taste of a purified tea extract by controlling non-polymer catechins, the percentage of gallate body in the non-polymer catechins, and the gallic acid content and the non-polymer catechins to a specific ratio in the purified tea extract. Thus the present inventors have found out that it is possible to obtain a purified tea extract wherein the content of catechins little decreases after the sterilization of a beverage to which a purified tea extract is added.

According to the present invention, it is possible to provide a purified tea extract, which is reduced in bitterness, sourness and coarse taste, has a good affinity with various beverages, and little shows a decrease in the content of non-polymer catechins after the sterilization of a beverage to which the purified tea extract is added.

The term "non-polymer catechins (a)" as used herein is a generic term, which collectively encompasses a group of catechins, gallocatechins, catechingallates, gallocatechingallates, epicatechins, epigallocatechins, epicatechingallates and epigallocatechingallates, and the concentration of non-polymer catechins is defined based on the total content of these eight catechins.

In the purified tea extract according to the present invention, the non-polymer catechins (a) are contained at from 45 to 90 wt. %, preferably from 50 to 88 wt. %, more preferably from 55 to 85 wt. %, even more preferably from 60 to 83 wt. %. A great deal of non-polymer catechins can be readily ingested insofar as the content of non-polymer catechins falls within this range. A content of non-polymer catechins lower than 45 wt. % results in a stronger coarse taste, while a content of non-polymer catechins higher than 90 wt. % leads to an increase in the bitterness of a beverage.

The non-polymer catechins in the purified tea extract according to the present invention include a gallate body consisting of epigallocatechingallates, gallocatechingallates, epicatechingallates and catechingallates, and a non-gallate body consisting of epigallocatechins, gallocatechins, epicatechins and catechin. Because the gallate body which is an ester-type non-polymer catechins are strong in bitterness, the percentage of non-polymer catechin gallate body (the gallate body rate) in the non-polymer catechins (a) in the purified tea extract according to the present invention is from 0.001 to 47 wt. %, preferably from 0.01 to 45 wt. %, more preferably from 0.1 to 43 wt. %, even more preferably from 1 to 40 wt. %, far more preferably from 5 to 35 wt. % from the viewpoints of bitterness reduction and productivity.

From the standpoint of taste such as bitterness and sourness, the content of gallic acid in the purified tea extract according to the present invention is not greater than 0.3, preferably 0.1 or smaller, more preferably 0.07 or smaller, but may be preferably 0 or greater, more preferably 0.0001 or greater, even more preferably 0.001 or greater, all in terms of the ratio of gallic acid to the non-polymer catechins.

As the concentration of free amino acids relative to the non-polymer catechins in the purified tea extract according to the present invention, the weight ratio of the free amino acids to the non-polymer catechins may be 0.1 or smaller, preferably 0.08 or smaller, more preferably 0.07 or smaller, but may be preferably 0 or greater, more preferably 0.00001 or greater, even more preferably 0.0001 or greater.

As the concentration of sucrose and glucose relative to the non-polymer catechins in the purified tea extract according to the present invention, the weight ratio of the (sucrose+glucose) to the non-polymer catechins may be 0.16 or smaller, preferably 0.15 or smaller, more preferably 0.14 or smaller, but may be preferably 0 or greater, more preferably 0.0001 or greater, even more preferably 0.001 or greater.

As the concentration of caffeine relative to the non-polymer catechins in the purified tea extract according to the present invention, the caffeine/the non-polymer catechins (weight ratio) may be 0.2 or smaller, preferably 0.15 or smaller, more preferably 0.1 or smaller, even more preferably 0.05 or smaller, but may be preferably 0 or greater, more preferably 0.0001 or greater, even more preferably 0.001 or greater, from the standpoint of improvements in taste.

As a tea extract usable for the purified tea extract according to the present invention, an extract obtained from tea leaves can be mentioned. A mixture of the caffeine-containing extract derived from a caffeine-containing plant (e.g. coffee) and a tea extract can be used as well. For example, use of tea leaves prepared from tea leaves of the Genus *Camellia*, for example, *C. sinensis, C. assamica* and the *Yabukita* variety, or their hybrids can be cited specifically. Such prepared tea leaves include green teas such as *sencha* (middle-grade green tea), *bancha* (coarse green tea), *gyokuro* (shaded green tea), *tencha* (powdered tea) and *kamairicha* (roasted tea), semi-fermented teas represented by oolong tea, and fermented teas led by black tea. It is also possible to use tea leaves subjected to treatment in contact with carbon dioxide in its supercritical state. A green tea extract is more preferable as a tea extract to be used for preparing the purified tea extract according to the present invention.

As a method for extracting a tea extract, a method such as stirring extraction or drip extraction can be used. An organic acid or organic acid salt, such as sodium ascorbate, may be added beforehand to water upon extraction. It is also possible to make combined use of boiling deaeration or an extraction method which is conducted while bubbling an inert gas such as nitrogen gas to eliminate dissolved oxygen, that is, under the so-called non-oxidizing atmosphere. The tea extract obtained as described above can be used in the present invention as it is or after it is dried or concentrated. Illustrative examples of the forms of tea extracts include liquid, slurry, semi-solid and solid.

Instead of employing an extract obtained from tea leaves as a tea extract to be used for purification, it is also possible to employ a concentrate of a tea extract in a form dissolved in or diluted with water or an organic solvent or to employ an extract from tea leaves and a concentrate of a tea extract in combination.

The term "a concentrate of a tea extract" as used herein means a concentrate of an extract obtained from tea leaves with hot water or an aqueous solution of an organic solvent, and means, for example, those prepared by the processes disclosed in JP-A-59-219384, JP-A-04-020589, JP-A-05-260907, JP-A-05-306279 and the like. As a specific tea extract, a commercially-available crude catechin preparation such as "POLYPHENON" (product of Tokyo Food Techno Co., Ltd.), "TEAFURAN" (product of ITO EN, LTD.) or "SUNPHENON" (product of Taiyo Kagaku Co., Ltd.) can be used as a solid tea extract.

For the control of the percentage of gallate body in the purified tea extract according to the present invention, a natural tea extract can be used at it is, or its percentage of gallates can be reduced by subjecting it to hydrolysis treatment. As the hydrolysis treatment, alkali hydrolysis, hydrolysis by enzymatic treatment, or the like can be mentioned specifically. From the viewpoint of the stability of non-polymer catechins, hydrolysis by enzymatic treatment is preferred.

As a method for hydrolytically treating a tea extract by an enzyme, hydrolysis treatment by an enzyme having tannase activity is preferred. The expression "having tannase activity" as used herein means that the activity to degrade tannin is in possession, and enzymes having such activity can be used. No particular limitation is imposed on its origin, but tannase obtainable by culturing a tannase-producing fungus of the *Aspergillus, Penicillium, Rhizopus* or *Mucor* genus in a manner known per se in the art can be mentioned. This tannase can be used, whether it is an unpurified product or a purified product. As a specific commercial enzyme product having tannase activity, tannase "KIKKOMAN" (product of Kikkoman Corporation), tannase "SANKYO" (Sankyo Lifetec Co., Ltd.), "SUMIZYME TAN" (product of Shinnihon Chemicals Corporation) or the like may be used. Treated with an enzyme having such tannase activity, the ester bonds in gallate bodies in non-polymer catechins are hydrolyzed and results in reduction of the percentage of non-polymer catechingallate body.

The concentration of non-polymer catechins upon treatment of the tea extract with the enzyme having tannase activity may be preferably from 0.1 to 22 wt. %, more preferably from 0.25 to 18 wt. %, even more preferably from 0.5 to 16.5 wt. %. A concentration lower than 0.1 wt. % leads to a large load on a subsequent concentration step, and therefore, is not preferred from the standpoint of productivity. On the other hand, a concentration higher than 22 wt. % requires a long time for the hydrolysis treatment, and therefore, is not preferred from the standpoints of productivity and the taste of the tea extract. As a specific method for the treatment with the enzyme having tannase activity, a powdery or solution-form enzyme which has tannase activity to the non-polymer catechins in the tea extract can be added preferably at from 1 to 300 Units/g-non-polymer catechins, more preferably at from 3 to 200 Units/g-non-polymer catechins, even more preferably at from 5 to 150 Units/g-non-polymer catechins from the standpoints of effectively decreasing non-polymer catechingallate body and terminating the enzymatic reaction at an optimal percentage of non-polymer catechin gallate body. It is to be noted that "1 Unit" indicates an amount of enzyme that hydrolyses 1 micromole of ester bonds, which are contained in tannic acid, in water of 30° C. As the holding temperature during the enzyme treatment, the treatment may be conducted while holding the temperature preferably at from 5 to 60° C., more preferably at from 10 to 50° C., even more preferably at from 10 to 45° C.

In the treatment of the tea extract by the enzyme having tannase activity, the reduction in the percentage of non-polymer catechingallate body may preferably be 5 wt. % or more from the standpoint of reducing bitterness and astringency. A reduction smaller than 5 wt. % cannot decrease the non-polymer catechingallate body much so that no effect can be expected for the reduction of bitterness and astringency. In the control of the percentage of gallate body by the treatment with the enzyme having tannase activity, it is preferred to determine the end point of the reaction by relying upon the pH of the tea extract under the treatment. The pH at the end point of the reaction may be preferably from 3.0 to 6.0, more preferably from 3.3 to 5.3.

For the termination of the hydrolysis reaction with the enzyme, the enzyme activity is inactivated to stop the reaction. The enzyme inactivation temperature may be preferably from 60 to 100° C., more preferably from 75 to 95° C. At an enzyme inactivation temperature lower than 60° C., the enzyme can hardly be inactivated to any sufficient extent in a short time, so that the reaction proceeds and the enzyme reaction cannot be stopped within the intended range of the percentage of non-polymer catechingallate body. Further, the holding time after the arrival at the inactivation temperature may be preferably from 10 to 1,800 seconds, more preferably from 30 to 1,200 seconds, even more preferably from 30 to 600 seconds from the standpoints of enzyme inactivation and taste. As an inactivation method for the enzyme reaction, the inactivation may be conducted by batchwise heating or by continuous-hold heating making use of a plate-type heat exchanger or a holding tube, or the like.

To remove fine particles remaining in the tea extract, it is preferred to subject the extract to centrifugation after the enzyme treatment or before the enzyme treatment. As to the type of a centrifuge, one capable of producing centrifugal force sufficient to remove fine particles is preferred, and industrially, a continuous centrifuge suited for mass treatment is employed.

Preferably, the tea extract treated with the enzyme may then be concentrated, for example, by reduced-pressure concentration, reverse osmosis membrane treatment, or the like. It may also be dried, for example, by spray drying or freeze drying as needed. As the form of the enzyme-treated tea extract at this stage, a liquid, slurry, semi-solid or solid form can be mentioned. From the viewpoint of dispersibility in an organic solvent such as ethanol, a slurry, semi-solid or solid form is preferred. As the purified tea extract according to the present invention, an enzyme-treated tea extract and an enzyme-untreated tea extract may be mixed such that after the mixing, the percentage of non-polymer catechingallate body falls within the range of from 0.001 to 47 wt. %.

According to the hydrolysis treatment, hydrolysis byproducts such as gallic acid are formed. As a method for removing these byproducts, there can be mentioned an organic-solvent-depending, selective dissolution method which makes use of differences in solubility between non-polymer catechins and byproducts, or a method that makes use of differences in polarity between non-polymer catechins and byproducts such as gallic acid to have the non-polymer catechins or the byproducts selectively adsorbed on an adsorbent carrier such that the byproducts, free amino acids, sucrose and glucose are decreased.

The purified tea extract according to the present invention can be obtained by removing gallic acid, free amino acids, sucrose and glucose from a tea extract, in which gallate body has been decreased, in a manner to be described hereinafter.

As the organic-solvent-dependent, selective dissolution method which makes use of the differences in solubility between the non-polymer catechins and the byproducts such as gallic acid, free amino acids, sucrose and glucose, there can be mentioned a method that subjects a hydrolysis treatment product to solid-liquid extraction after its drying or a method that subjects a solution of a hydrolysis treatment product to liquid-liquid extraction.

As solvents for use in the extraction, ester solvents, ketone solvents, ether solvents, alcohol solvents and halogenated solvents can be used. Specifically, ethyl acetate, diethyl ether, methyl ethyl ketone, butanol, chloroform, dichloromethane and the like can be mentioned.

Especially from the viewpoint of use in foods, ethyl acetate and dichloromethane are preferred.

As the method that decreases byproducts such as gallic acid, free amino acids, sucrose and glucose by having them selectively adsorbed on an adsorbent carrier, there can be mentioned a method that decreases the byproducts such as gallic acid, free amino acids, sucrose and glucose by having them adsorbed on an adsorbent carrier or a method that causes adsorption of the non-polymer catechins but does not cause adsorption of the byproducts such as gallic acid, free amino acids, sucrose and glucose.

As the method that removes the byproducts such as gallic acid, free amino acids, sucrose and glucose by having them adsorbed on an adsorbent carrier, a method that removes them by having them adsorbed on an ion-exchange resin can be mentioned. As a separation method that makes use of their differences in molecule size from the non-polymer catechins, a method that causes their adsorption on activated carbon can be mentioned.

As the method that decreases the byproducts such as gallic acid, free amino acids, sucrose and glucose by having the non-polymer catechins selectively adsorbed on an adsorbent carrier while making use of the differences in polarity between the non-polymer catechins and the byproducts such as gallic acid, free amino acids, sucrose and glucose, a method that causes adsorption of the non-polymer catechins on a synthetic adsorbent can be mentioned.

This method can be carried out by having a tea extract adsorbed on the synthetic adsorbent after its hydrolysis.

In general, a synthetic adsorbent is an insoluble polymer of a three-dimensionally-crosslinked structure and is substantially free of functional groups such as ion-exchanging groups. Preferably, one containing less than 1 meq/g of ion-exchanging groups can be used. Usable as synthetic adsorbents in the present invention include those having styrene-based matrices, for example, "AMBERLITE XAD4, XAD16HP, XAD1180, XAD2000" (supplier: Rohm & Haas USA), "DIAION HP20, HP21" (products of Mitsubishi Chemical Corporation), "SEPABEADS SP850, SP825, SP700, SP70" (products of Mitsubishi Chemical Corporation), and "VPOC1062" (product of Bayer AG); those having modified styrene-based matrices with adsorption capacity enhanced by nucleus substitution with bromine atoms, for example, "SEPABEADS SP205, SP206, SP207" (products of Mitsubishi Chemical Corporation); those having methacrylic matrices, for example, "DIAION HP1MG, HP2MG" (products of Mitsubishi Chemical Corporation); those having phenol-based matrices, for example, "AMBERLITE XAD761" (product of Rohm & Haas, Inc.); those having acrylic matrices, for example, "AMBERLITE XAD7HP" (product of Rohm & Haas, Inc.); those having polyvinyl-based matrices, for example, "TOYOPEARL HW-40C" (product of TOSOH CORPORATION); those having dextran-based matrices, for example, "SEPHADEX LH-20" (product of Pharmacia AB); etc.

As synthetic adsorbents, those having styrene-, methacrylic-, acrylic- or polyvinyl-based matrices are preferred, with those having styrene-based matrices being more preferred from the standpoint of separability between catechins and gallic acid.

As a method of having the tea extract adsorbed on the synthetic adsorbent after its hydrolysis treatment, it is possible to adopt a batch method that includes adding the synthetic adsorbent to the tea extract after its hydrolysis treatment, stirring the mixture, and subsequent to adsorption, recovering the synthetic adsorbent by a filter operation; or a column method that includes continuous adsorption treatment by using a column packed with the synthetic adsorbent. From the standpoint of productivity, the continuous treatment method by using the column is preferred.

The column with the synthetic adsorbent packed therein may preferably allow a 95 vol % aqueous solution of ethanol to pass therethrough beforehand at a SV (space velocity)=0.5 to 10 $[h^{-1}]$ and a flow ratio of from 2 to 10 [v/v] to the synthetic adsorbent to remove the raw monomer of the synthetic adsorbent, impurities in the raw monomer, etc. The adsorptive capacity for non-polymer catechins can be improved by a subsequent method that includes passing water through at a SV=0.5 to 10 $[h^{-1}]$ and a flow ratio of from 1 to 60 [v/v] to the synthetic adsorbent to remove ethanol and hence to replace the solution in the synthetic adsorbent with a water-based medium.

As conditions for passing the tea extract through the column, the concentration of the non-polymer catechins in the tea extract upon having the non-polymer catechins adsorbed on the synthetic adsorbent may be preferably from 0.1 to 22 wt. %, more preferably from 0.1 to 15 wt. %, even more preferably from 0.5 to 10 wt. %, far more preferably from 0.5 to 3 wt. % from the standpoint of the efficiency of adsorption on the synthetic adsorbent.

As further conditions for passing the tea extract through the column packed with the synthetic adsorbent, it is preferred to pass the tea extract through at a flow velocity, SV (space velocity)=0.5 to 10 $[h^{-1}]$ and a flow ratio of from 0.5 to 20 [v/v] to the synthetic adsorbent. A flow velocity higher than 10 $[h^{-1}]$ may lead to insufficient adsorption of non-polymer catechins, and a flow ratio greater than 20 [v/v] may result in unstable adsorption of non-polymer catechins.

It is preferred to wash the synthetic adsorbent with water or an aqueous solution of an organic solvent after the adsorption of the tea extract. As the aqueous solution for use in washing the synthetic adsorbent, water of pH 7 or lower is preferred from the standpoint of the recovery rate of catechins, and a mixed system with an organic solvent may also be used. As the organic solvent, acetone, methanol, ethanol or the like can be mentioned, with ethanol being preferred from the viewpoint of use in foods. The concentration of the contained organic solvent may be preferably from 0 to 20 wt. %, more preferably from 0 to 10 wt. %, even more preferably from 0 to 5 wt. % from the standpoint of the recovery rate of catechins.

In this washing step, it is preferred to remove impurities, which have adhered on the synthetic adsorbent, at a flow velocity, SV (space velocity)=0.5 to 10 $[h^{-1}]$ and a flow ratio to the synthetic adsorbent of from 1 to 10 [v/v]. From the standpoints of impurity removing effects and the recovery rate of non-polymer catechins, it is more preferred to conduct the washing at a flow velocity, SV=0.5 to 5 $[h^{-1}]$ and a flow ratio of from 1 to 5 [v/v].

When an aqueous solution of an organic solvent is used as an eluent upon elution of non-polymer catechins, a water-soluble organic solvent is preferred as the organic solvent, and acetone, methanol, ethanol or the like can be mentioned. From the viewpoint of use in foods, ethanol is preferred. As such an organic solvent leads to a high yield of non-polymer catechins, a reduction in the amount of impurities, etc., the organic solvent may preferably be used as an aqueous solution. As the concentration of the organic solvent, it is preferred to use the organic solvent preferably as a 1 to 95 wt. % aqueous solution, more preferably as a 10 to 90 wt. % aqueous solution, even more preferably as a 20 to 80 wt. % aqueous solution.

Preferably, non-polymer catechins may be eluted at a flow velocity, SV (space velocity)=0.5 to 5 $[h^{-1}]$ and a flow ratio to the synthetic adsorbent of from 1 to 15 [v/v]. From the standpoints of productivity and the recovery rate of non-polymer catechins, it is more preferred to conduct the elution at a flow velocity, SV=1 to 3 $[h^{-1}]$ and a flow ratio of from 2 to 10 [v/v].

The use of an aqueous solution of an organic solvent as an eluent for the elution of non-polymer catechins is preferred from the standpoints of the simplification of steps and purification cost.

When a basic aqueous solution is used upon elution of non-polymer catechins, it is possible to suitably use, as a basic aqueous solution for the elution of non-polymer catechins, an alkaline aqueous solution of an alkali metal salt, alkaline earth metal salt or the like, preferably a sodium- or potassium-containing alkaline aqueous solution, for example, an aqueous solution of sodium hydroxide, an aqueous solution of sodium carbonate or the like. The pH of the alkaline aqueous solution may preferably be in a range of from 7 to 14, and from the standpoint of the recovery rate of non-polymer catechins, from 9 to 13.8 may be preferred, with from 10 to 13.5 being more preferred. As a sodium-containing aqueous solution of pH 7 to 14, a 4% or lower aqueous solution of sodium hydroxide, a 1 N aqueous solution of sodium carbonate or the like can be mentioned. A basic aqueous solution and an organic solvent may be used as a mixture. From the standpoint of separability between caffeine and catechins, the concentration of the organic solvent may be preferably in a range of from 0 to 90 wt. %, more preferably from 0 to 50 wt. %, even more preferably from 0 to 20 wt. %.

In the elution step, two or more basic aqueous solutions different in pH from each other can be used as basic aqueous solutions for the elution, and in the ascending order of pH, these basic aqueous solutions can be brought into contact with the synthetic adsorbent. At the respective pH levels, different non-polymer catechins and other components can be desorbed.

It is preferred to elute non-polymer catechins at a SV (space velocity)=2 to 10 $[h^{-1}]$ and a flow ratio to the synthetic adsorbent of from 1 to 30 [v/v]. From the standpoints of productivity and the recovery rate of non-polymer catechins, it is more preferred to conduct the elution at a SV=3 to 7 $[h^{-1}]$ and a flow ratio of from 3 to 15 [v/v].

The use of a basic aqueous solution as the eluent for the elution of non-polymer catechins is preferred from the standpoints of the color tone of the purified tea extract and its recovery rate through the treatment with activated carbon.

When eluted with the basic aqueous solution, the eluate of non-polymer catechins is basic. From the viewpoint of the stability of non-polymer catechins, the pH of the eluate may be adjusted preferably to 7 or lower, more preferably to from 1 to 6, even more preferably to from 1 to 5, far more preferably to from 2 to 4. Specifically, it is possible to use the neutralization with an acid, or the removal of alkali metal ions by electrodialysis or ion exchange resin. As the ion exchange resin, the use of an $H^+$ cation-exchange resin is preferred. For the simplicity of the process, it is preferred to adjust the pH with an ion exchange resin. As the cation exchange resin, it is possible to use specifically "AMBERLITE 200CT, IR120B, IR124 or IR118", "DIAION SK1B, SK1BH, SK102, PK208 or PK212", or the like.

The synthetic adsorbent usable in the present invention can be reused after practice of the present invention. Specifically, regeneration is attained by passing an organic solvent such as ethanol through to desorb insolubles such as caffeine adsorbed on the synthetic adsorbent. As an alternative, it is possible to mention a method that includes passing an aqueous solution of an alkali such as sodium hydroxide through or washing therewith to desorb water-soluble components remaining on the synthetic adsorbent. Additionally, washing with steam may be combined further.

The eluate of non-polymer catechins may be subjected to subsequent steps after concentrating it as needed.

When the resultant eluate of non-polymer catechins is turbid, its clarification is preferred. As a specific operation for the clarification, it can be mentioned to separate the solid portion and the water-soluble portion from each other by filtration and/or centrifugation.

In the production of the purified tea extract according to the present invention, the byproducts such as gallic acid, free amino acids, sucrose and glucose can also be decreased by a method to be described hereinafter instead of the method that makes use of a synthetic adsorbent. Described specifically, a tea extract in which the percentage of gallate body has been decreased is mixed in a mixed solution of an organic solvent and water, the weight ratio of which is greater than 90/10 but not greater than 97/3, and the resulting precipitate is then separated. After the separation of the precipitate, water is added to the mixed solution and/or the organic solvent is removed from the mixed solution as needed such that the weight ratio of the organic solvent to the water in the mixed solution is adjusted to a range of from 40/60 to 70/30, and the precipitated turbid components are then separated. The mixed solution can then be subjected to contact treatment with activated carbon and acid clay or activated clay. The organic solvent and water in the tea extract can be distilled off by using a method such as reduced-pressure distillation. The green tea extract after the treatment can be either solid or liquid. To prepare the green tea extract in a solid form, it may be powderized by a method such as freeze drying or spray drying.

As the organic solvent for use in the purification of the tea extract, ethanol, methanol, acetone, ethyl acetate or the like can be mentioned. Among these, a hydrophilic organic solvent such as methanol, ethanol or acetone is preferred, with ethanol being more preferred in view of the use of the purified green tea extract in foods.

As water, deionized water, tap water, natural water or the like can be mentioned. These organic solvent and water can be mixed with the green tea extract either after combining them together or separately. Preferably, however, they may be mixed with the tea extract subsequent to combining them into a mixed solution.

In the production of the purified tea extract according to the present invention, the weight ratio of the organic solvent to water upon dispersing the tea extract in the mixed solution of the organic solvent and water may be adjusted preferably to the range of greater than 90/10 but not greater than 97/3, more preferably to a range of from 92/8 to 97/3, even more preferably to a range of from 92/8 to 95/5 from the standpoints of the extraction efficiency of non-polymer catechins and taste. The resulting precipitate is then removed by a known method such as filtration.

In the production of the purified tea extract according to the present invention, it is preferred to conduct the treatment by adding from 10 to 40 weight parts, preferably from 10 to 30 weight parts of the tea extract (on a dry weight basis) to 100 weight parts of the mixed solution of the organic solvent and water, because the tea extract can be treated efficiently.

In the production of the purified tea extract according to the present invention, no particular limitation is imposed on the method for mixing the tea extract in the mixed solution of the organic solvent and water insofar as the weight ratio of the organic solvent to water upon final treatment of the tea extract is greater than 90/10 but not greater than 97/3. For example, the weight ratio of the organic solvent to water may be adjusted to the range of greater than 90/10 but not greater than 97/3 by progressively adding the organic solvent subsequent to dissolution of the tea extract in water, or water may be gradually added to give a similar ratio subsequent to suspension of the tea extract in the organic solvent. Preferred from the standpoint of extraction efficiency is the method that progressively adds the organic solvent subsequent to the dissolution in water. As the addition time of water and the organic solvent either as the mixed solution or separately, it is preferred to slowly add them dropwise over a time of from 10 to 60 minutes or so. Their dropwise addition under stirring is preferred to improve the extraction efficiency of catechins. It is preferred to provide a stirring time of from 10 to 600 minutes or so after completion of the dropwise addition, because such a stirring time can further improve the extraction efficiency of catechins. These treatments can be conducted preferably at from 10 to 60° C., more preferably at from 10 to 50° C., even more preferably at from 10 to 40° C. The green tea extract may be added in its entirety at once, or may be added in two or more portions, for example, 2 to 4 portions. Subsequently, the resulting precipitate is removed by a method such as filtration.

It is also preferred to add water to the mixed solution or to remove the organic solvent from the mixed solution such that the weight ratio of the organic solvent to water in the mixed solution from which the precipitate has been removed is adjusted to from 40/60 to 70/30, preferably to from 45/55 to 60/40. The content of the organic solvent in the mixed solution can be decreased by distilling off the organic solvent by a method such as reduced-pressure distillation. The addition of water to the mixed solution after the removal of the precipitate can be effected by adding deionized water, tap water, natural water or the like.

No particular limitation is imposed on the still standing time for the precipitation of turbid components after the addition or water and/or the removal of the organic solvent. For example, the still standing time may be preferably from 2 minutes to 50 hours, more preferably from 2 minutes to 24 hours, even more preferably from 5 minutes to 6 hours. The precipitation temperature for the turbid components may be preferably from −15 to 78° C., more preferably from 5 to 40° C., even more preferably from 5 to 25° C. Upon separation of the turbid components from the mixed solution subsequent to the precipitation of the turbid components, the temperature may be preferably from −15 to 78° C., more preferably from 5 to 40° C., even more preferably from 5 to 25° C. Temperatures outside these ranges may lead to inferior separability, and may result in such a case that a change may be observed in the properties of the solution. No particular limitation is imposed on the method upon separation of the turbid components, and for example, centrifugation, filtration or the like can be mentioned.

In the production of the purified tea extract according to the present invention, the tea extract may preferably be brought into contact with one or more of activated carbon, acid clay and activated clay to conduct decaffeination as needed upon mixing the tea extract with the mixed solution of the organic solvent and water.

No particular limitation is imposed on the activated carbon to be used insofar as it is generally used on an industrial level. Usable examples include commercially-available products such as "ZN-50" (product of Hokuetsu Carbon Industry Co., Ltd.), "KURARAY COAL GLC", "KURARAY COAL PK-D" and "KURARAY COAL PW-D" (products of Kuraray Chemical K.K.), and "SHIROWASHI AW50", "SHIROWASHI A", "SHIROWASHI M" and "SHIROWASHI C" (products of Takeda Pharmaceutical Company Limited). The pore volume of the activated carbon may be preferably from 0.01 to 0.8 mL/g, more preferably from 0.1 to 0.7 mL/g. Concerning the specific surface area, on the other hand, one having a specific surface area in a range of from 800 to 2,000 $m^2/g$, preferably from 900 to 1,600 $m^2/g$ is preferred. It is to be noted that these physical values are those determined by the nitrogen adsorption method.

The activated carbon can be added preferably in a proportion of from 0.5 to 15 weight parts, more preferably in a proportion of from 0.5 to 10 weight parts, even more preferably in a proportion of from 1.0 to 8 weight parts to 100 weight parts of the mixed solution of the organic solvent and water. The addition of the activated carbon in an excessively small proportion leads to a deterioration in decaffeination efficiency, while its addition in an unduly large proportion leads to an increase in cake resistance. It is, therefore, not preferred to add the activated carbon in a proportion outside the above-described range.

Acid clay and activated clay to be used both contain, as general chemical components, $SiO_2$, $Al_2O_3$, $Fe_2O_3$, $CaO$, MgO, etc., and those having $SiO_2/Al_2O_3$ ratios of from 3 to 12, preferably from 4 to 9 are preferred. Also preferred are those which have compositions containing from 2 to 5 wt. % of $Fe_2O_3$, from 0 to 1.5 wt. % of CaO and from 1 to 7 wt. % of MgO. Activated clay is obtained by treating a naturally-mined acid clay (montmorillonite clay) with a mineral acid such as sulfuric acid, and is a compound having a porous structure of large specific surface area and adsorptive capacity. Further treatment of acid clay with an acid is known to change its specific surface area such that its decoloring ability is improved and its physical properties are modified.

The specific surface areas of acid clay and activated clay may preferably be from 50 to 350 $m^2/g$ although they vary depending on the degree or the like of the acid treatment, and their pHs (5 wt. % suspensions) may be preferably from 2.5 to 8, more preferably from 3.6 to 7. As acid clay, for example, a commercially-available product such as "MIZUKA ACE #600" (product of Mizusawa Chemical Industries, Ltd.) can be used.

Acid clay or activated clay can be added preferably in a proportion of from 0.5 to 30 weight parts, more preferably in a proportion of from 1.5 to 20 weight parts, even more preferably from 2.5 to 15 weight parts to 100 weight parts of the mixed solution of the organic solvent and water. The addition of acid clay or activated clay in an unduly small proportion leads to a deterioration in decaffeination efficiency, while the addition of acid clay or activated clay in an excessively large proportion leads to an increase in the cake resistance in the filtration step. It is, therefore, not preferred to add acid clay or activated clay in a proportion outside the above-described range.

When activated carbon is used in combination with acid clay or activated clay, the ratio of activated carbon to acid clay or activated clay may be from 1 to 10 of acid clay or activated clay to 1 activated carbon by weight, with activated carbon: acid clay or activated clay=1:1 to 1:6 being preferred.

To conduct selective decaffeination as needed, it is preferred in the present invention to bring the tea extract into contact with activated carbon and/or acid clay or activated clay upon mixing the tea extract with the mixed solution of the organic solvent and water. In this case, no particular limitation is imposed on the order of contact between the tea extract, the mixed solution of the organic solvent and water, and activated carbon and/or acid clay or activated clay. There can be mentioned, for example, (1) a method that includes adding the tea extract to the mixed solution of the organic solvent and water and bringing the resulting mixture into contact with activated carbon and then with acid clay or activated clay, (2) a method that includes adding the tea extract to the mixed solution of the organic solvent and water and bringing the resulting mixture into contact with acid clay or activated clay and then with activated carbon, and (3) a method that includes adding activated carbon to the mixed solution of the organic solvent and water, adding the tea extract to the resulting mixture, and then adding acid clay or activated clay. Preferred is, however, (4) a method that includes adding acid clay or activated clay to the mixed solution of the organic solvent and water, adding the tea extract to the resulting mixture, and then adding activated carbon.

It is preferred to conduct filtration between the addition of each one of these components and the addition of the next component. When the green tea extract is added by dividing it into two portions, filtration may be conducted between the addition of one of the two portions and that of the other portion.

When contacting and mixing the tea extract with a dispersion of acid clay or activated clay in the mixed solution of the organic solvent and water, the contact and mixing may preferably be conducted by adjusting the pH to a range of from 3 to 6 to obtain a purified green tea extract with non-polymer catechins efficiently extracted therein. Upon effecting the contact, an organic acid such as citric acid, lactic acid, tartaric acid, succinic acid or malic acid may preferably be added at a weight ratio of the organic acid to the non-polymer catechins (organic acid/non-polymer catechins) in a range of from 0.02 to 0.20.

When contacting and mixing the tea extract with the dispersion of acid clay or activated clay in the mixed solution of the organic solvent and water, it is preferred to firstly control the temperature of the solution at from 10 to 30° C. and then to raise it to from 20 to 60° C. in the course of the contact in that the dissolution of the tea extract can be promoted and the efficiency of extraction of catechins into the dispersion can be improved.

The preferred production process, which makes use of the treatment with acid clay or activated clay and the mixed solution of the organic solvent and water upon production of the purified tea extract according to the present invention, can be carried out by the following procedure. A tea extract in which the percentage of gallate body has been lowered is mixed in a mixed solution of the organic solvent and water the weight ratio of which is greater than 90/10 but not greater than 97/3, and subsequent to removal of the resulting precipitate, water is added to and/or the organic solvent is removed from the resulting mixture as needed such that the weight ratio of the organic solvent to water in the resulting mixture is adjusted to from 40/60 to 70/30, preferably from 45/55 to 60/40. Subsequently, the precipitated turbid components are separated.

Described specifically, upon contacting and mixing with activated carbon and/or acid clay or activated clay, it is preferred firstly to mix the tea extract with a mixed solution of the organic solvent and water, the weight ratio of which is greater than 90/10 but not greater than 97/3, to subject the resulting mixture to contact treatment with activated carbon and/or acid clay or activated clay, next to remove the activated carbon and/or acid clay or activated clay together with the resulting precipitate, to add water to the filtrate and/or to remove the organic solvent from the filtrate, and then to remove the precipitated turbid components. Further, the contact with activated carbon may be carried out before conducting the next step, that is, the addition of water and/or the removal of the organic solvent; or the addition of water and/or the removal of the organic solvent may be conducted, and subsequent to removal of the precipitated turbid components, the contact with activated carbon may be carried out.

Upon bringing the tea extract solution into contact with activated carbon and acid clay or activated clay or with activated carbon, the treatment can be conducted by any method, for example, batchwise treatment, continuous column treatment or the like. In general, there can be mentioned inter alia a method in which powdery activated carbon or the like is added, the resulting mixture is stirred to selectively adsorb caffeine, and a filter operation is then conducted to obtain a decaffeinated filtrate or a method in which caffeine is selectively adsorbed by continuous treatment through a column packed with granular activated carbon or the like. Further, the contact between the tea extract and activated carbon may preferably be conducted by a method such as continuous treatment through a column of activated carbon.

The purified tea extract according to the present invention obtained as described above has been decreased in bitterness, sourness and coarse taste, and in particular, beverages and foods with the tea extract added therein have decreased bitterness, sourness and coarse taste. Moreover, the beverages and foods with the tea extract added therein are characterized in that their catechins contents are not lowered when subjected to sterilization treatment. Therefore, the beverages and foods with the purified tea extract according to the present invention added therein are not impaired in their inherent taste, and are high in catechins content.

As foods with which the purified tea extract according to the present invention can be added, no particular limitation is imposed on their forms, and there can be mentioned inter alia beverages; cooked rice and the like; wheat flour foods such as breads and cakes; seasonings such as sauces, fermented soybean paste (miso) and soy sauce; soybean foods such as fermented soybean (natto); emulsified foods such as cream, dressings, mayonnaise and margarine; processed marine foods; processed meat products; preserved vegetables; noodles; soups including powdered soups; dairy products such as jelly, cheese and yoghurt; confectioneries such as snack confectioneries, chewing gum, candies and chocolates; and health foods such as tablets and granules.

As beverages in which the purified tea extract according to the present invention can be added, there can be mentioned green tea as non-fermented tea; tea-based beverages selected from semi-fermented teas and fermented teas; and non-tea beverages. The semi-fermented teas include, for example, oolong tea, and the fermented teas include, for example, black tea. The non-tea beverages include, for example, carbonated beverages as soft drinks, non-carbonated beverages such as fruit juices, vegetable juices, soymilk drinks, cow milk, coffee beverages, water, near waters, sports drinks, enhanced waters and nutritious supplement drinks, nutritional beverages, alcoholic beverages, and the like.

As the concentrations of non-polymer catechins in these beverages and foods, it is preferred to contain non-polymer catechins at a concentration of preferably from 250 to 1,000 mg, more preferably from 400 to 850 mg, even more preferably from 500 to 750 mg per meal.

These beverages and foods can each be produced in a manner known per se in the art except for the addition of the purified tea extract according to the present invention.

EXAMPLES

Measurement Methods of Non-Polymer Catechins, Caffeine and Gallic Acid

A high-performance liquid chromatograph (model: "SCL-10AVP") manufactured by Shimadzu Corporation was used. The chromatograph was fitted with a liquid chromatograph column packed with octadecyl-introduced silica gel, "L-Column, TM ODS" (4.6 mm in diameter×250 mm; product of Chemicals Evaluation and Research Institute, Japan). A sample solution was filtered through a filter (0.45 µm), and then subjected to chromatography at a column temperature of 35° C. by the gradient elution method. Using the non-polymer catechins product of Mitsui Norin Co., Ltd. as a standard product of non-polymer catechins, the caffeine product of SIGMA-ALDRICH Corp. as a standard product of caffeine, and the gallic acid product of Wako Pure Chemical Industries, Ltd. as a standard product of gallic acid, quantifications were performed by the calibration curve method. A solution A, mobile phase, was a solution containing acetic acid at 0.1 mol/L in distilled water, while a solution B, mobile phase, was a solution containing acetic acid at 0.1 mol/L in acetonitrile. The measurement was conducted under the conditions of 20 µL sample injection volume and 280 nm UV detector wavelength.

Measurement of Free Amino Acids
 Free Tryptophan
 (Analytical Instrument)
  Model: "LC-10AD" (manufactured by Shimadzu Corporation)
  Detector: Spectrofluorometer "RF-10Ax1"
  Column: "Intersil ODS-2" (4.6 mm inner diameter×250 mm length)
 Free Amino Acids Other than Free Tryptophan
 (Analytical Instrument)
  Model: "L-8800 High-Speed Amino Acid Analyzer" (manufactured by Hitachi Ltd.)
  Column: "Hitachi Custom Ion-Exchange Resin", 4.6 mm inner diameter×60 mm length
  Mobile phase: "L-8500 PF Buffer"
  Reaction solution: Ninhydrin reagent
 Analytical Method of Sucrose and Glucose
 (Analytical Instrument)
  Model: "LC-10ADvp" (manufactured by Shimadzu Corporation)
  Detector: Differential Refractometer "RID-10A" (manufactured by Shimadzu Corporation)
  Column: "wakosil 5NH2" (4.6 mm in diameter×250 mm) (Wako Pure Chemical Industries, Ltd.)
  Eluent: $CH_3CN/H_2O=75/25$ (v/v)
  Sample injection volume: 10 µL
 Assessment Method of Taste Each tea extract was diluted with water to give a non-polymer catechins concentration of 0.15%. With respect to its bitterness, sourness and coarse taste, five male assessors made grading and assessment in accordance with the following standards.

Assessment of Bitterness:
1: Hardly sensed.
2: Somewhat hardly sensed.
3: Slightly sensed.
4: Sensed.

Assessment of Sourness:
1: Hardly sensed.
2: Somewhat hardly sensed.
3: Slightly sensed.
4: Sensed.

Assessment of Coarse Taste:
1: Hardly sensed.
2: Somewhat hardly sensed.
3: Slightly sensed.
4: Sensed.

Example 1

Purified Green Tea Extract A (1) A green tea extract ("POLYPHENON HG", product of Tokyo Food Techno Co., Ltd.; 500 g) was dissolved in water (15,000 g) to obtain a "green tea extract" (15,500 g, pH 5.6). (The concentration of non-polymer catechins in the green tea extract=1.05 wt. %, the percentage of gallate body in the green tea extract=52.5 wt. %).

The green tea extract was kept at a temperature of 15° C., tannase ("TANNNASE KTFH", product of KIKKOMAN Corporation, 500 U/g) was added to the green tea extract to give a concentration of 500 ppm, and the resulting mixture was held for 15 minutes. When the percentage of gallate body had decreased to 44.2 wt. %, the solution was heated to 90° C., at which the solution was held for 2 minutes to inactivate the enzyme so that the reaction was terminated (pH 5.3). Concentration processing was then performed at 55° C. and 2.7 kpa to a Brix concentration of 30% by reduced-pressure concentration. Further, the concentrate was spray-dried to obtain a powdery "green tea extract treated with the enzyme having tannase activity" (400 g). The thus-obtained green tea extract had the following data—the content of non-polymer catechins: 32.1 wt. %, the percentage of non-polymer catechingallate body: 44.0 wt. %, and the content of gallic acid: 1.7 wt. %.

(2) Acid clay ("MIZUKA ACE #600", product of Mizusawa Chemical Industries, Ltd.; 100 g) was dispersed in a 92 wt. % aqueous solution of ethanol (800 g) at ambient temperatures under the stirring conditions of 250 r/min. After stirring was conducted for approximately 10 minutes, the green tea extract (200 g) treated with the enzyme having tannase activity as obtained above in (1) was poured, and still at room temperature, stirring was continued for approximately 3 hours (pH 4.0). Subsequently, the formed precipitate and the acid clay were filtered off by No. 2 filter paper. Deionized water (417 g) was added to the thus-obtained filtrate, and stirring was conducted at 15° C. for about 5 minutes under the stirring conditions of 100 r/min. From the mixture, the precipitated turbid components were separated at the operation temperature of 15° C. (6,000 rpm, 5 minutes) by using a small cooled centrifuge (manufactured by Hitachi Koki Co., Ltd.). The separated solution was brought into contact with activated carbon ("KURARAY COAL GLC", product of Kuraray Chemical Co., Ltd.; 30 g), and without a break, was filtered through a 0.2-μm membrane filter. Finally, deionized water (200 g) was added, ethanol was distilled off at 40° C. and 2.7 kpa, and then, the water content was adjusted to obtain a "purified green tea extract A".

Example 2

Purified Green Tea Extract B (1) A green tea extract obtained in a similar manner as in Example 1 was kept at a temperature of 15° C., tannase ("TANNNASE KTFH") was added to the green tea extract to give a concentration of 500 ppm, and the resulting mixture was held for 40 minutes. When the percentage of gallate body had decreased to 30 wt. %, the solution was heated to 90° C., at which the solution was held for 2 minutes to inactivate the enzyme so that the reaction was terminated (pH 5.0). Concentration processing was then performed at 55° C. and 2.7 kpa to a Brix concentration of 25% by reduced-pressure concentration. Further, the concentrate was spray-dried to obtain a powdery "green tea extract treated with the enzyme having tannase activity" (400 g). The thus-obtained green tea extract had the following data—the weight content of non-polymer catechins: 29.8%, the percentage of non-polymer catechingallate body: 32.5 wt. %, and the content of gallic acid: 3.6 wt. %.

(2) Conducting similar purification treatment as in Example 1, a "purified green tea extract B" was obtained.

Example 3

Purified Green Tea Extract C (1) Hot water of 88° C. (45 kg) was added to green tea leaves (produce of Kenya, large leaf variety; 3 kg). After batchwise extraction for 30 minutes under stirring, coarse filtration was conducted through a 200-mesh screen. To remove fine powder from the extract, a centrifugal separation operation was then performed to obtain a "green tea extract" (37.2 kg) (the concentration of non-polymer catechins in the green tea extract=0.91 wt. %, the percentage of gallate body in the green tea extract=51.2 wt. %, caffeine: 0.17 wt. %).

The green tea extract was kept at a temperature of 15° C., and tannase ("TANNASE KTFH") was then added to the green tea extract to give a concentration of 450 ppm. The solution was held for 40 minutes. When the percentage of gallate body had decreased to 30.5 wt. %, the solution was heated to 90° C., at which the solution was held for 2 minutes to inactivate the enzyme so that the reaction was terminated (pH 5.1). Concentration processing was then performed at 70° C. and 6.7 kpa to a Brix concentration of 20% by reduced-pressure concentration. Further, the concentrate was spray-dried to obtain a powdery "tannase-treated green tea extract" (0.9 kg). The thus-obtained green tea extract had the following data—the content of non-polymer catechins: 27.8 wt. %, the percentage of non-polymer catechingallate body: 30.3 wt. %, and gallic acid: 3.6 wt. %. The "tannase-treated green tea extract" (10 g) was dissolved in deionized water (300 g) under stirring at 25° C. for 30 minutes.

(2) Next, a synthetic adsorbent "SP-70" (product of Mitsubishi Chemical Corporation; 36 mL) packed in a stainless steel column 1 (22 mm inner diameter×96 mm height, volume: 36.5 mL) was washed with 95 (v/v) ethanol (720 mL) at a SV=1 (h$^{-}$) beforehand, and was then washed with deionized water (720 mL). An ion-exchange resin "SK1BH" (product of Mitsubishi Chemical Corporation; 14.7 mL) packed in a glass column 2 (16 mm inner diameter×80 mm height, volume: 16.1 mL) was washed beforehand at a SV=1 (h$^{-1}$) with 95 (v/v) ethanol (300 mL), and was then washed with deionized water (300 mL). The above-obtained, tannase-treated solution (2) (144 g) was passed through the column 1 at a SV=1 (h$^{-1}$). The column 1 was then washed with deionized water (36 mL) at a SV=2 (h$^{-1}$). Subsequently, a 0.1 wt. % aqueous solution of sodium hydroxide (216 mL) was passed through at a SV=5 (h$^{-1}$). The eluate was continuously passed through the column 2 to conduct deionization, so that a non-polymer catechin composition (552 g, pH 2.7) was obtained. By reduced-pressure concentration, concentration processing was then conducted at 70° C. and 6.7 kpa to obtain a purified green tea extract C.

Example 4

Purified Green Tea Extract D (1) A green tea extract obtained in Example 3 was kept at a temperature of 15° C., tannase ("TANNNASE KTFH") was added to the green tea extract to give a concentration of 430 ppm, and the resulting mixture was held for 120 minutes. When the percentage of gallate body had decreased to 5.2 wt. %, the solution was heated to 90° C., at which the solution was held for 2 minutes to inactivate the enzyme so that the reaction was terminated (pH 4.8). Concentration processing was then performed at 70° C. and 6.7 kpa to a Brix concentration of 20% by reduced-pressure concentration. Further, the concentrate was spray-dried to obtain a powdery "tannase-treated green tea extract" (0.9 kg). The thus-obtained purified green tea extract had the following data—the content of non-polymer catechins: 25.7%, the percentage of non-polymer catechin gallate body: 4.5 wt. %, and gallic acid: 7.3 wt. %.

(2) Purification making use of a synthetic adsorbent was next conducted as in Example 3 to obtain a "purified green tea extract D".

Comparative Example 1

The green tea extract ("POLYPHENON HG", product of Tokyo Food Techno Co., Ltd.) of Example 1-(1) was used.

Comparative Example 2

Green Tea Extract E

The tannase-treated green tea extract of Example 4-(1) was used.

Comparative Example 3

A green tea extract ("TEAFURAN 90S" (product of ITO EN, LTD.) was used.

Comparative Example 4

Green Tea Extract F (1) Into a column extractor of 350 mm in inner diameter, hot water of 88° C. (124 kg) was poured, and then, green tea leaves (produce of Kenya, large leaf variety; 6.2 kg) were added. After the contents were allowed to stand for 5 minutes, the solution was drawn from a lower part to conduct drip extraction. To remove fine powder from the extract, a centrifugal separation operation was then performed to obtain a "green tea extract" (93.5 kg) (the concentration of non-polymer catechins in the green tea extract=0.86 wt. %, the percentage of gallate body in the green tea extract=55.2 wt. %).

Concentration processing was then performed at 70° C. and 6.7 kpa to a Brix concentration of 20% by reduced-pressure concentration. Further, the concentrate was spray-dried to obtain a powdery "green tea extract" (2.1 kg). The thus-obtained "green tea extract" (10 g) was dissolved under stirring at 25° C. for 30 minutes in deionized water (300 g).

(2) Next, a synthetic adsorbent "SP-70" (product of Mitsubishi Chemical Corporation; 36 mL) packed in a stainless steel column 1 (22 mm inner diameter×96 mm height, volume: 36.5 mL) was washed with 95 (v/v) ethanol (720 mL) at a SV=1 (h⁻) beforehand, and was then washed with deionized water (720 mL). An ion-exchange resin "SK1BH" (product of Mitsubishi Chemical Corporation; 14.7 mL) packed in a glass column 2 (16 mm inner diameter×80 mm height, volume: 16.1 mL) was washed with 95 (v/v) ethanol (300 mL) at a $SV=1$ $(h^{-1})$ beforehand, and was then washed with deionized water (300 mL). The above-obtained, tannase-treated solution (2) (144 g) was allowed to pass through the column 1 at a $SV=1$ $(h^{-1})$. The column 1 was then washed with deionized water (36 mL) at a $SV=2$ $(h^{-1})$. Subsequently, a 0.1 wt. % aqueous solution of sodium hydroxide (216 mL) was passed through at a $SV=5$ $(h^{-1})$. The eluate was continuously passed through the column 2 to conduct deionization, so that a non-polymer catechin composition (552 g, pH 2.7) was obtained. Concentration processing was then performed at 70° C. and 6.7 kpa by reduced-pressure concentration to obtain a green tea extract F.

The analysis results and taste assessment results of the green tea extracts obtained in Examples 1-4 and Comparative Examples 1-4 are shown in Table 1.

Example 5

To aliquots of an extract of coffee beans from Brazil (solid concentration: 2%), the above-described green tea extracts of Examples 1-4 and Comparative Examples 1-4 were added, respectively, to give a non-polymer catechins concentration of 1%. The thus-obtained coffee beverages were filled in cans, followed by retort sterilization (124° C., 20 min). After the sterilization, the coffee beverages were subjected to centrifugation at 12,000 rpm for 5 minutes by a bench centrifuge. The contents of catechins in the supernatants were measured to determine the percentages of catechins, which were still remaining after the sterilization, based on the added amount.

Example 6

To aliquots of an orange juice (100% reconstituted from a concentrate, Brix degree: 11), the above-described green tea extracts of Examples 1-4 and Comparative Examples 1-4 were added, respectively, to give a non-polymer catechins concentration of 1%. The thus-obtained orange juice beverages were filled in cans, followed by retort sterilization (124° C., 20 min). After the sterilization, the orange juice beverages were subjected to centrifugation at 12,000 rpm for 5 minutes by a bench centrifuge. The contents of catechins in the supernatants were measured to determine the percentages of catechins, which were still remaining after the sterilization, based on the added amount. The results are shown in Table 1. As is evident from the results in Table 1, it is appreciated that the green tea extract according to the present invention is decreased in coarse taste, bitterness and sourness and is excellent in various beverages and foods.

TABLE 1

|  | Ex. 1 Green tea extract A | Ex. 2 Green tea extract B | Ex. 3 Green tea extract C | Ex. 4 Green tea extract D | Comp. Ex. 1 "POLY-PHENON HG" (Tokyo Food Techno) | Comp. Ex. 2 Green tea extract E | Comp. Ex. 3 "TEAFRAN 90S" (ITO EN, LTD) | Comp. Ex. 4 Green tea extract F |
|---|---|---|---|---|---|---|---|---|
| Content of non-polymer catechins (a) [%] | 15.0 | 15.0 | 15.0 | 15.0 | 32.5 | 25.7 | 76.0 | 15.0 |
| Content of non-polymer catechins in solid content [%] | 63.5 | 60.6 | 59.0 | 57.3 | 32.5 | 25.7 | 76.0 | 62.8 |
| Percentage of gallate body [%] | 44.8 | 31.4 | 27.8 | 5.1 | 51.3 | 4.5 | 99.4 | 55.3 |
| (b) Content of gallic acid [%] | 0.6 | 1.8 | 0.3 | 0.6 | 0.1 | 7.3 | 0.0 | 0.3 |
| Gallic acid/non-polymer catechins [—] | 0.040 | 0.120 | 0.020 | 0.040 | 0.003 | 0.284 | 0.000 | 0.020 |
| (Sucrose + glucose)/non-polymer catechins [—] | 0.104 | 0.109 | 0.003 | 0.004 | 0.173 | 0.283 | — | 0.003 |
| Free amino acids/non-polymer catechins [—] | 0.038 | 0.048 | 0.0003 | 0.0003 | 0.128 | 0.144 | — | 0.0002 |
| Caffeine/non-polymer catechins [—] | 0.024 | 0.017 | 0.004 | 0.003 | 0.160 | 0.233 | — | 0.003 |
| Bitterness | 2 | 1 | 1 | 1 | 3 | 1 | 4 | 3 |
| Sourness | 1 | 2 | 1 | 1 | 1 | 3 | 1 | 1 |
| Coarse taste | 1 | 1 | 1 | 1 | 4 | 4 | 1 | 1 |
| Percentage of remainder in coffee after sterilization [%] | 79.2 | 82.0 | 82.5 | 85.3 | 72.0 | 76.9 | 72.1 | 78.4 |

TABLE 1-continued

|  | Ex. 1 Green tea extract A | Ex. 2 Green tea extract B | Ex. 3 Green tea extract C | Ex. 4 Green tea extract D | Comp. Ex. 1 "POLY-PHENON HG" (Tokyo Food Techno) | Comp. Ex. 2 Green tea extract E | Comp. Ex. 3 "TEAFRAN 90S" (ITO EN, LTD) | Comp. Ex. 4 Green tea extract F |
|---|---|---|---|---|---|---|---|---|
| Percentage of remainder in orange juice after sterilization [%] | 65.0 | 67.0 | 68.0 | 68.9 | 45.9 | 64.1 | 60.8 | 61.5 |

The invention claimed is:

1. A purified tea extract, comprising non-polymer catechins;
   wherein
   a content of the non-polymer catechins in a solid content of the purified tea extract is from 45 to 90 wt. %,
   percent by weight of gallate body in the non-polymer catechins is from 0.001 to 35 wt. %, and
   a weight ratio of gallic acid/non-polymer catechins is not greater than 0.07.

2. The purified tea extract according to claim 1, wherein a weight ratio of free amino acids/non-polymer catechins in the purified tea extract is not greater than 0.08.

3. The purified tea extract according to claim 1, wherein a weight ratio of (sucrose+glucose)/non-polymer catechins in the purified tea extract is not greater than 0.15.

4. The purified tea extract according to claim 1, wherein a weight ratio of caffeine/non-polymer catechins in the purified tea extract is not greater than 0.2.

5. The purified tea extract according to claim 1, wherein the purified tea extract is a green tea extract.

6. A food comprising the purified tea extract according to claim 1.

7. A beverage comprising the purified tea extract according to claim 1.

8. The purified tea extract according to claim 2, wherein a weight ratio of (sucrose+glucose)/non-polymer catechins in the purified tea extract is not greater than 0.15.

9. The purified tea extract according to claim 2, wherein a weight ratio of caffeine/non-polymer catechins in the purified tea extract is not greater than 0.2.

10. The purified tea extract according to claim 3, wherein a weight ratio of caffeine/non-polymer catechins in the purified tea extract is not greater than 0.2.

11. The purified tea extract according to claim 1, wherein the non-polymer catechins is a catechin or catechin mixture consisting of at least one material selected from the group consisting of a catechin, a gallocatechin, a catechingallate, a gallocatechingallate, a epicatechin, a epigallocatechin, a epicatechingallate and a epigallocatechingallate.

12. The purified tea extract according to claim 1, wherein the gallate body consists of at least one material selected from the group consisting of an epigallocatechingallate, a gallocatechingallate, an epicatechingallate and a catechingallate.

13. The purified tea extract according to claim 1, wherein said solid content of the purified tea extract is from 50 to 88 wt. %.

14. The purified tea extract according to claim 1, wherein said solid content of the purified tea extract is from 55 to 85 wt. %.

15. The purified tea extract according to claim 1, wherein said solid content of the purified tea extract is from 60 to 83 wt. %.

16. The purified tea extract according to claim 1, wherein the percent by weight of the gallate body in the non-polymer catechins is from 0.01 to 35 wt. %.

17. The purified tea extract according to claim 1, wherein the percent by weight of the gallate body in the non-polymer catechins is from 0.1 to 35 wt. %.

18. The purified tea extract according to claim 1, wherein the percent by weight of the gallate body in the non-polymer catechins is from 1 to 35 wt. %.

19. The purified tea extract according to claim 1, wherein the percent by weight of the gallate body in the non-polymer catechins is from 5 to 35 wt. %.

* * * * *